(12) United States Patent
Kunath et al.

(10) Patent No.: US 9,285,229 B2
(45) Date of Patent: Mar. 15, 2016

(54) METHOD OF UPDATING A DATABASE OF A NAVIGATION DEVICE AND NAVIGATION DEVICE

(75) Inventors: Peter Kunath, Munich (DE); Marcel Voigt, Munich (DE); Stefan Baptist, Munich (DE); Carsten-Christian Spindler, Karlsruhe (DE); Marcus Heitmann, Eching (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 678 days.

(21) Appl. No.: 13/544,683

(22) Filed: Jul. 9, 2012

(65) Prior Publication Data

US 2013/0013557 A1  Jan. 10, 2013

(30) Foreign Application Priority Data

Jul. 8, 2011  (EP) ..................................... 11173270

(51) Int. Cl.
  *G01C 21/00* (2006.01)
  *G01C 21/26* (2006.01)
  *G01C 21/32* (2006.01)
(52) U.S. Cl.
  CPC ................ *G01C 21/26* (2013.01); *G01C 21/32* (2013.01)
(58) Field of Classification Search
  USPC .......................................... 707/609; 701/409
  See application file for complete search history.

(56) References Cited

U.S. PATENT DOCUMENTS

| 6,246,958 | B1 | 6/2001 | Hirono | |
|---|---|---|---|---|
| 7,139,663 | B2 * | 11/2006 | Machii et al. ................. | 701/452 |
| 7,580,699 | B1 * | 8/2009 | Shaw ................... | G06Q 20/102 455/410 |
| 2007/0093960 | A1 * | 4/2007 | Atarashi ........................ | 701/211 |
| 2007/0096945 | A1 * | 5/2007 | Rasmussen et al. ........ | 340/995.1 |
| 2008/0059889 | A1 * | 3/2008 | Parker et al. .................. | 715/748 |
| 2008/0086262 | A1 * | 4/2008 | Asahara ................. | G01C 21/32 701/452 |
| 2008/0163073 | A1 * | 7/2008 | Becker ................... | G06Q 30/00 715/753 |
| 2009/0177677 | A1 * | 7/2009 | Mikusiak ............... | G01C 21/32 |
| 2010/0095231 | A1 * | 4/2010 | Marlow ........................ | 715/764 |
| 2010/0153007 | A1 * | 6/2010 | Crowley ....................... | 701/206 |
| 2010/0274469 | A1 * | 10/2010 | Takahata ........... | G06F 17/30241 701/532 |
| 2010/0274472 | A1 * | 10/2010 | Sakai ..................... | G01C 21/32 701/532 |
| 2011/0137546 | A1 | 6/2011 | Roesser et al. | |
| 2011/0282575 | A1 * | 11/2011 | Masuda ............. | G01C 21/3626 701/533 |
| 2013/0006925 | A1 * | 1/2013 | Sawai ............... | G06F 17/30241 707/609 |

FOREIGN PATENT DOCUMENTS

| DE | 102005029744 | 12/2006 |
|---|---|---|
| EP | 2053357 | 4/2009 |

* cited by examiner

*Primary Examiner* — Jensen Hu
(74) *Attorney, Agent, or Firm* — Artegis Law Group, LLP

(57) ABSTRACT

To update a database of a navigation device which stores at least a base version of a digital map, versions of the digital map which are available locally in the database or remotely from the navigation device are identified. To execute the navigation task, a version of the digital map is selected for execution of the navigation task. Data from a sub-set of storage blocks in which the selected version is stored is required to execute the navigation task. Depending on whether all storage blocks of the sub-set are already stored locally in the database, data stored in storage blocks of the sub-set which are not yet stored locally in the database are downloaded via a wireless interface. The downloaded data are stored in the database without modifying the base version of the digital map.

16 Claims, 6 Drawing Sheets

METHOD OF UPDATING A DATABASE OF A NAVIGATION DEVICE AND NAVIGATION DEVICE

1. CLAIM OF PRIORITY

This patent application claims priority from EP Application No. 11 173 270.7 filed Jul. 8, 2011, which is hereby incorporated by reference.

2. FIELD OF TECHNOLOGY

The invention relates to methods and devices for updating a database of a navigation device. The invention relates in particular to a method of updating a database and to a navigation device in which a database storing map data is maintained.

2. RELATED ART

Navigation devices are known which perform functions such as route searches between two locations. Modern navigation devices also may provide additional functionalities, such as serving as a travel guide which outputs, upon demand, information on points of interest (POI). Modern navigation devices also may provide additional driver assist functions, such as Advanced Driver Assist System functions.

In order to address the ever increasing demand for databases which reflect recent changes in road networks, various approaches may be pursued.

In one approach, the database stored locally in a navigation device is updated by first transferring the data required to perform the update as incremental update information, then re-compiling the map data using the transferred data, and replacing the old version of the map data with the new version generated in the compilation procedure. This approach may have some shortcomings. For example, the data amounts which must be transferred to the navigation device may be very significant because the map data of at least one country is usually updated in such a procedure. In some cases, the navigation device may need to be connected to a computer having high-speed access to a wide area network (WAN) in order to complete the update in an acceptable time. Moreover, owing to the complexity of databases which support the various functions provided in modern navigation devices, it may take considerable effort for the vendor to prepare the data required to perform the update from raw data. Significant testing may be required to reduce the risk of errors occurring upon compilation performed in the navigation device or in the user's computer. The compilation of the map data may still be prone to errors, owing to the complexity of ensuring consistency across various map versions when incremental updates are used.

In another approach, on-line navigation may be performed with the aid of a central server that is remote from the navigation device. In such an approach, rather than maintaining the map data stored locally in the navigation device, navigation tasks are transmitted to the server. The server may execute the task and may transmit a result back to the navigation device, which outputs the result. The navigation device thus acts as a terminal which displays results of navigation tasks executed on the server. While, for each individual navigation task, the data amounts which need to be transferred may be moderate, the data amounts may easily add up when similar navigation tasks are performed repeatedly. Conventional on-line navigation approaches do not readily provide re-use of data. There may be shortcomings when the data connection has poor quality in certain regions, such as rural areas.

There is a need for methods and navigation devices which allow a map database to be maintained such that changes in the road network or in other data may be reflected in the database, while mitigating the shortcomings associated with incremental updates where compilation is performed by the navigation device or by a user's computer. There is in particular a need for such methods and navigation devices which do not require significant data amounts to be transferred plural times if one and the same navigation task is performed repeatedly.

SUMMARY OF THE INVENTION

According to an aspect, a method of updating a database of a navigation device is provided. The database stores at least a base version of a map for a geographical area. Versions of the map for the geographical area which are available locally in the database or remotely from the navigation device are identified. When a navigation task is to be executed, a version of the map is selected for execution of the navigation task. The selected version includes data stored in a plurality of storage blocks. Data from a sub-set of the plurality of storage blocks is required to execute the navigation task. Based on whether all storage blocks of the sub-set which are required to execute the navigation task are already stored locally in the database, data stored in storage blocks of the sub-set which are not yet stored locally in the database are selectively downloaded over a wireless interface. The downloaded data are stored in the database without modifying the base version of the map. The data of the sub-set then stored locally in the database is used to execute the navigation task.

In the method, data of a selected version of the map is downloaded when required upon execution of a navigation task. The downloaded data is stored in the database in addition to the base version of the map. The downloaded data is not combined with the base version, but is used to execute the navigation task without prior combination with the base map. A storage device of the navigation device serves as cache for the downloaded data.

The downloading of data may be implemented at a block level. As used herein, the term "storage block" refers to a block of a database. Such a storage block, conventionally also referred to as a "page", may have a pre-defined, fixed size for a database file. That is, for a given database file, each block may have the same size. A version of the map may include different components, such as a component storing destination data, a component storing routing information, a component storing points of interests etc. Each one of the components may be stored in a separate file. The size of a storage block, e.g., page, for one component may be different from the size of a storage block, e.g., page, for another component. Downloading at the block level may be performed separately for the various components.

While the downloading of data is implemented at the block level, the blocks do not need to be retrieved individually. Transfer of data may be performed such that a plurality of storage blocks are combined into a data packet which is then downloaded by the navigation device.

With the downloading of data being implemented at the block-level, different versions of the digital map which are generated from different raw data and/or which have different map data formats may be combined more easily. For example, the base version of the digital map may be generated from raw data coming from a first supplier and/or may have a first map data format. The selected version of the digital map, for which data may first need to be downloaded from a download center, may be generated from raw data coming from a second supplier different from the first supplier and/or may have a second map data format different from the first map data format.

The downloaded data may be stored in the database as an overlay to the base map, without modifying the base map. This allows the retrieved storage blocks of the selected version to be re-used. The base version can be continued to be used as a fall-back option.

The data which is respectively downloaded may be limited to those storage blocks of the selected version which contain data required for execution of the respective navigation task and which are not yet stored locally. As a result, excessive data transfers over an over-the-air interface may be avoided.

The downloading of storage blocks may be performed selectively dependent upon a block size of storage blocks. A threshold comparison may be performed to decide whether a storage block is to be downloaded. A decision on whether a storage block is to be downloaded may be made based on the comparison of the size of the storage block to the threshold. The threshold may be adjusted based on transmission rates which are available for downloading the storage blocks. If it is decided that a high-volume storage block is not downloaded, the data in the base version stored locally may be used. One example for a case where this may occur is the downloading of 3D data, which may have high-volume storage blocks.

The navigation task may be any one of a variety of navigation tasks, such as for example route guidance, route search, inputting a destination, requesting information on a point of interest, requesting travel guide information, map display or similar.

The wireless interface may be an interface for any one, or any combination, of wireless networks, such as for example WLAN, Wi-Fi, GSM, 3G or LTE.

The data of the sub-set of storage blocks which has been stored in the database may be re-used when the navigation task is re-executed or when another navigation task that requires data from the sub-set of storage blocks is executed. Re-use of this downloaded data may be continued until a more recent version of the digital map is identified in the identifying step.

When an even more recent version of the digital map is identified in the identifying step and is selected in the selecting step, data for this latest version may be downloaded upon execution of the respective navigation task. The downloaded storage blocks of this latest version may be stored in the database without modifying older versions of the map data which are already stored in the database. In another implementation, at least one older version of downloaded data may be deleted when a newer version of downloaded data is available.

After the downloading and storing steps, the database may include a plurality of different versions of the map data for a portion of the geographical area. There may be at least one version of the digital map which, when stored at the navigation device, does not cover the full geographical area covered by the base version of the digital map. If there is a limited number of typical use cases for a given navigation device, only a small portion of the full digital map may need to be downloaded and stored in the navigation device. For example, users tend to frequently travel along a very limited number of routes in everyday use. In this case, only those storage blocks of an updated version of the complete digital map may be downloaded and stored which are required for performing navigation tasks along this limited number of routes.

When another navigation task is executed, respectively one of the plurality of different versions may be selected for execution of the other navigation task. This allows the navigation device to either re-use an updated version of the digital map previously retrieved or to use the base version. When not all storage blocks which contain data required for the execution of the other navigation task are stored locally in the database, the downloading and storing may be performed again, thereby supplementing the data of the selected version which is stored locally in the navigation device.

The database may store a version identifier for each version of the digital map which is available locally in the database. The version identifiers may be used to identify the available versions and/or to access data already included in the database based on the selected version.

When data is downloaded and stored in the database, a version identifier for the selected version may be selectively stored in the database if no storage block of the selected version has been stored in the database prior to performing the retrieving step. Thereby, version information in the database may be updated in accordance with the downloading of data from more recent versions of the digital map.

The base version of the digital map may be selected to execute the navigation task if a version identifier for the base version indicates that the base version is as recent as or more recent than all versions of the digital map which are available remotely from the navigation device. Thereby, data traffic over the wireless interface may be reduced while the base version is the most recent version available.

The database may be a relational database which includes the version identifiers as attributes. Data management may thereby be facilitated.

The database may include an index structure. When data is selectively downloaded, the index structure may be updated based on a version identifier for the selected version. The index structure may be an index structure generated based on a distance metric. The index structure may be a B-index tree or a B plus-index tree.

For each version of the digital map which is available locally in the database, there may be a separate file stored in a storage device of the navigation device. When downloaded data is stored, a version identifier for the selected version and the version identifiers for versions which are available locally in the database may be compared. Based on the comparison, either a new file may be generated for storing the downloaded data or the downloaded data may be added to an existing file. Instead of using separate files for storing different versions of the digital map, other ways of organizing data into data sets may be used. For example, separate tables of a relational database may be used to store data belonging to different versions of the digital map. The downloaded data may be added to a file having a version identifier identical to the version identifier for the selected version if such a file already exists in the database prior to performing the downloading step.

In the method, a data transfer via the wireless interface may be monitored to verify whether the data transfer meets a pre-defined criterion. The pre-defined criterion may include a threshold for data transmission rates which should be exceeded and/or availability of certain service levels, such as UMTS or LTE. The base version may be selected for execution of the navigation task if the data transfer fails to meet the pre-defined criterion. Thereby, the base version may be used as a fall-back option. This remains possible because the base version is not overwritten when storage blocks of more recent versions are downloaded and stored.

Execution of the navigation task may be started before the downloading is completed. During execution of the navigation task, a data transfer over the wireless interface may be monitored to verify whether the data transfer via the wireless interface meets a pre-defined criterion or meets plural pre-defined criteria. The pre-defined criterion may include a threshold for data transmission rates which should be exceeded, or a comparison to plural different thresholds, and/or availability of certain service levels, such as UMTS or LTE.

The download process may be controlled based on whether the data transfer from a download center to the navigation device over the wireless interface meets a pre-defined criterion, or meets plural pre-defined criteria. For example, larger data amounts may be downloaded while the navigation device is located in a region where services providing a high data transmission rate are available. For example, larger data amounts may be downloaded while the navigation device is located in a region where LTE is available. Look-ahead logics may be used to determine which storage blocks are to be downloaded. For example, when a route is active or a route search is being performed, storage blocks relating to areas located along the route which are still remote from the vehicle may be downloaded while the navigation device is positioned in a region in which the data transmission rate exceeds a certain threshold and/or in which a specific type of service, such as LTE, is available. Thereby, a relatively larger number of storage blocks may be downloaded in urban areas, while smaller data amounts must be transferred in rural areas where the available bandwidth may be limited. Intelligent pre-fetching of data may thus be implemented. Data may also be downloaded from a physical storage medium in areas in which data transmission rates between the download center and the navigation device are less than a threshold. Service stations may keep a copy of those blocks of latest version of the map data which correspond to a neighborhood of the respective service station, such that the data may be copied to the navigation device. The data may be selected based on a specific navigation task.

If the data transfer fails to meet a pre-defined criterion, execution of the navigation task may be terminated, the base version may be selected, and the base version may be used to re-execute the navigation task.

According to another aspect, a computer program is provided which comprises instruction code. The instruction code, when executed by a processor of a navigation device, directs the navigation device to perform the method of any one aspect or embodiment.

According to another aspect, a non-transitory storage medium is provided which has stored thereon instruction code which, when executed by a processor of a navigation device, directs the navigation device to perform the method of any one aspect or embodiment.

According to another aspect, a navigation device is provided. The navigation device comprises a database and a processing device. The database stores at least a base version of a map for a geographical area. The processing device is coupled to the database and configured to identify versions of the map for the geographical area which are available locally in the database or remotely from the navigation device. The processing device is configured to execute a navigation task. To perform the navigation task, the processing device is configured to select, based on the identified versions, a version of the map (e.g., digital) for execution of the navigation task, the selected version including data stored in a plurality of storage blocks, wherein data from a sub-set of the plurality of storage blocks is required to execute the navigation task. To perform the navigation task, the processing device is further config- ured to determine whether all storage blocks of the sub-set are stored locally in the database. To perform the navigation task, the processing device is further configured to selectively download, based on whether all storage blocks of the sub-set are already stored locally in the database, data stored in storage blocks of the sub-set which are not yet stored locally in the database, and to store the downloaded data in the database without modifying the base version of the digital map. The processing device is further configured to use the data of the sub-set to execute the navigation task.

For a navigation device having such a configuration, effects corresponding to the effects explained for the corresponding method may be attained.

The navigation device may comprise a transceiver coupled to the processing device. The processing device may be configured to wirelessly communicate, via the transceiver, with a download center in which updated versions of the digital map are provided for downloading.

The transceiver may be configured for communication in accordance with, fog example, WLAN, Wi-Fi, GSM, 3G or LTE communication standards.

According to yet another aspect, a download center is provided. The download center comprises a data store storing at least one version of a map (e.g., digital) for a geographical area. The download center comprises a computing device coupled to the data store. The computing device is configured to output information on versions of the digital map stored in the data store, in response to a request for information on available versions of the digital map. The computing device is configured to identify, in response to a download request including information on a version and on required map data, a sub-set of the storage blocks in which the respective version of the digital map is stored and to supply the identified sub-set of storage blocks, containing the required map data, to a requesting device.

The download center may include a wireless transmitter for transmitting the information on versions and/or for transmitting the identified sub-set of storage blocks.

The transmitter may be configured for communication with WLAN, Wi-Fi, GSM, 3G or LTE networks. The transmitter does not need to be a wireless transmitter, but may communicate, for example, with a wired backbone of the WLAN, Wi-Fi, GSM, 3G or LTE networks.

It is to be understood that the features mentioned above and those to be explained below can be used not only in the respective combinations indicated, but also in other combinations or in isolation.

These and other objects, features and advantages of the present invention will become apparent in light of the detailed description of the best mode embodiment thereof, as illustrated in the accompanying drawings. In the figures, like reference numerals designate corresponding parts.

DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Figure 1:
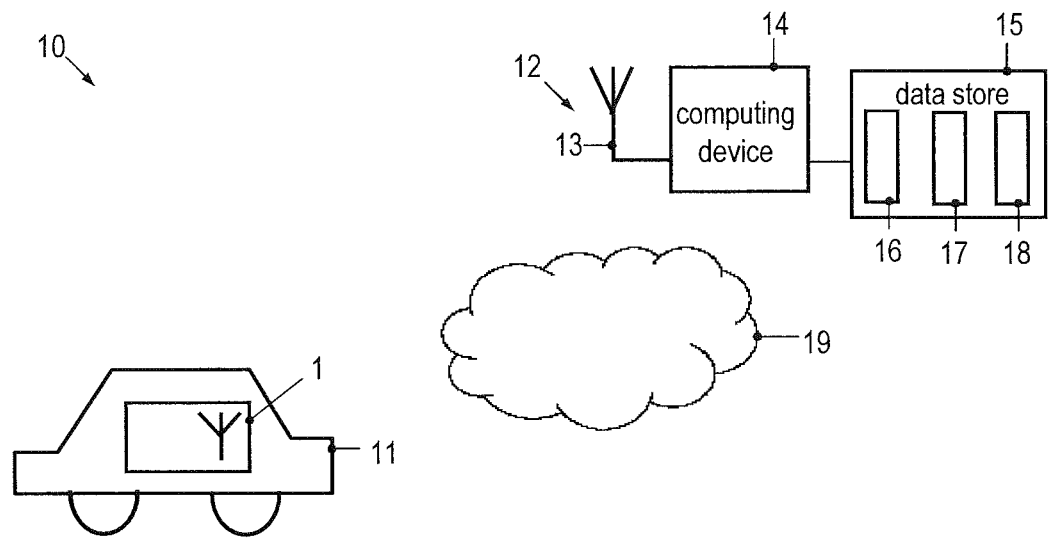
FIG. 1 is a schematic diagram of a system including a navigation device and a download center.

FIG. 1 is a schematic illustration of a system 10 which includes a vehicle 11, a download center 12, and a communication network 19. The vehicle 11 includes a navigation device 1. The navigation device 1 is configured for wireless communication with the download center 12 via the communication network 19. While only one vehicle 11 is illustrated, the system 11 may include a plurality of vehicles each respectively having a navigation device, which may communicate with the download center 12 via one or more communication networks.

The navigation device 1 includes a database storing at least a base version of a map (e.g., a digital map). The download center 12 includes a data store 15 in which at least one version of the digital map is stored. The data store 15 may store a plurality of data sets 16-18, each of which corresponds to a different version of the digital map. Each one of the different versions 16-18 stored at the data store 15 may cover the geographical area covered by the base version stored in the navigation device 1. Each one of the different versions 16-18 may be compiled, such that the files corresponding to versions 16-18 stored at the data store 15 are ready for use by the navigation device 1, without requiring compilation to be performed at the navigation device 1. Each one of the different versions 16-18 may be configured for use by the navigation device 1, without requiring the data of the respective version 16-18 to be combined with the base version stored at the navigation device.

For each one of the files corresponding to the versions 16-18, data may be stored in a plurality of storage blocks. A size of the block does not need to be identical for different versions 16-18, but has a given, pre-defined value for each database file of the versions 16-18. Each version 16-18 may include different components stored in separate database files. For example, a component storing destination locations, a component storing routing information, a component storing points of interest, etc. may be provided. Different components of a version may, but do not need to have the same sizes of storage blocks. By allowing the storage block sizes to vary between different components of one version of the digital map, enhanced flexibility can be attained.

Upon execution of a navigation task, such as a route search, route guidance or map display function, the navigation device 1 may verify whether a more recent version of the digital map than the base version is available at the download center 12. If a version having a more recent release date than the base version is available at the download center 12, a portion of this version may be downloaded to the navigation device 1. The download center 12 includes a transceiver 13 and computing device 14 to receive and process download requests.

The downloading of map data of a more recent version may be implemented at the block-level, or page level. The storage blocks, also referred to as pages, of the database which contain data required for execution of a specific navigation task may be selectively downloaded to the navigation device 1. The transfer may be implemented at the block- or page-level, rather than at the BLOB (binary large object) level.

While the downloading may be implemented at the block-level, several blocks may be combined to a larger data packet before the data packet is transmitted to the navigation device 1.

The downloading of map data may be implemented such that the downloading of map data of a more recent version than the one available in the navigation device is triggered by the execution of a navigation task. The downloading of the map data may be implemented such that only those blocks, e.g., pages, of the database which are required for execution of the navigation task are selectively downloaded.

The downloaded map data of a version of the digital map which is different from the base version may be stored in the database of the navigation device 1. The downloaded map data may be stored in the database without overwriting, or otherwise modifying, the base version stored in the database of the navigation device. The downloaded map data may be used for navigation without requiring the downloaded map data to be combined with the base version already stored in the database 3. The downloaded map data may be used for execution of a navigation task without requiring the downloaded map data to be compiled at the navigation device 1.

The downloaded map data of the more recent version may be re-used when the navigation task which has triggered downloading of the map data is re-executed, or when another navigation task is executed which requires data from the same blocks, e.g., pages, of this version of the database. The database of the navigation device thus serves as a cache for the downloaded blocks of the newer version.

Figure 2:
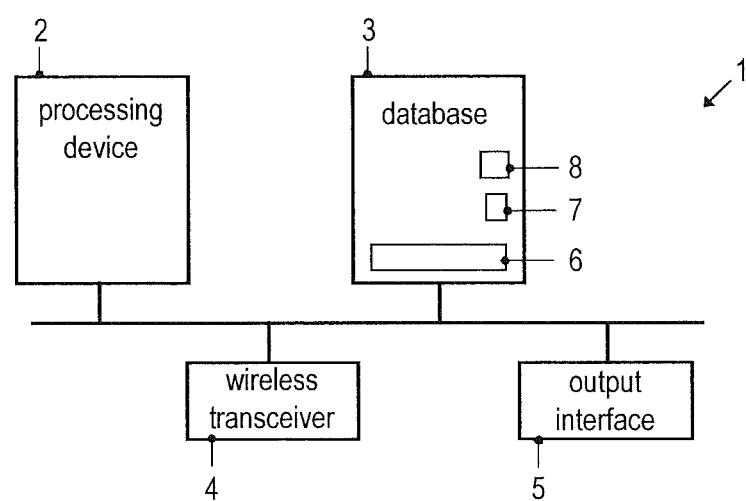
FIG. 2 is a schematic block representation of a navigation device.

FIG. 2 is a schematic block diagram illustration representation of an embodiment of the navigation device 1. The navigation device 1 may be installed in a vehicle and may be configured for wireless communication with the download center 12 in the system 10 of FIG. 1.

The navigation device 1 comprises a processing device 2 controlling the operation of the navigation device 1, e.g., according to control instructions stored in a memory. The processing device 2 may comprise a central processing unit, for example in the form of one or more microprocessors, digital signal processors or application-specific integrated circuits. The navigation device 1 further includes a database 3 stored in a storage device. The storage device storing the database 3 may comprise any one, or any combination, of various types of storage or memory media, such as random access memory, flash memory, a hard disk drive, removable memories such as a compact disk (CD), a DVD, a memory card or the like. The navigation device 1 may include, or may be coupled to, a wireless transceiver 4. The processing device 2 may transmit requests for information or map data using the wireless transceiver 4. The processing device 2 may process information on available version(s) of a digital map or map data received by the wireless transceiver 4. The navigation device 1 includes an output interface 5 for outputting information to a user. The output interface 5 may include an optical output device, an audio output device, or a combination thereof.

For example, the communication network 19 may be any one of a wide variety of networks, such as WLAN, Wi-Fi, GSM, 3G or LTE. The wireless transceiver 4 may correspondingly be a transceiver configured to communicate under any one, or any combination of, WLAN, Wi-Fi, GSM, 3G or LTE communication standards.

The navigation device may include additional components, such as an input interface and/or position sensor and/or a vehicle interface. The input interface may be configured to allow a user to input textual or voice information. The position sensor may be adapted to determine the current position of the vehicle in which the navigation device 1 is installed. The position sensor may comprise for example a GPS (Global Positioning System) sensor, a Galileo sensor, a position sensor based on mobile telecommunication networks and the like. The vehicle interface may allow the processing device 2 to obtain information from other vehicle systems or vehicle status information via the vehicle interface. The vehicle interface may for example comprise CAN (controller area network) or MOST (Media Oriented devices Transport) interfaces.

The database 3 stores a base version 6 of a digital map. The base version 6 may be kept in the database 3, without overwriting the data of the base version when map data of more recent versions are downloaded. This allows the base version 6 to be used as a fall-back version. The base version 6 may be used as a fall-back version when no on-line connection to the download center 12 can be established, when an established on-line connection breaks down due to poor transmission conditions before transmission of all data required to execute a navigation task has been completed, or in similar cases.

The database 3 may store map data of additional versions 7, 8 of the digital map, which have a release date which is more recent than a release date of the base version 6. The map data of the versions 7, 8 of the digital map may be downloaded from the download center 12 when a navigation task is to be executed. The map data of the versions 7, 8 which is stored locally in the navigation device may cover a geographical area which is included in the geographical area covered by the base version 6, but do not need to cover the full geographical area covered by the base version 6.

The map data of the version of the digital map 7 which is downloaded to the navigation device 1 and which is stored in the database 3 may be limited to those blocks of the respective database file stored in the download center 12 which contain data required for execution of those navigation tasks that are executed by the navigation device while this version is the most recent version made available by the download center 12. This data amount may be much smaller than the data amount of the base version 6. If the navigation device is widely used throughout the geographical area covered by the base version 6, the map data of the version of the digital map 7 may also cover a geographical area comparable to that of the base version as new navigation tasks continue to be executed over time. The map data of the version of the digital map 7 may then be supplemented with additional blocks of the file downloaded from the data store 15 as new navigation tasks are executed.

Similarly, the map data of the version 8 downloaded and stored in the database 3 may be limited to those blocks of the respective database file stored in the download center 12 which contain data required for execution of those navigation tasks which are executed by the navigation device while this version is the most recent version made available by the download center 12. The explanations given for version of the digital map 7 similarly apply to subsequent versions of the digital map, such as version 8.

Data from the versions 7, 8 of the digital map which is downloaded from the download center 12 is stored in the database 3 so as to be available for subsequent use in the navigation device, even after execution of the navigation task which triggered the respective data to be downloaded has been completed. As schematically illustrated in FIG. 2, map data from different versions of the digital map co-exists in the database 3. The base version 6 is not overwritten when data of a more recent version of the digital map is downloaded. Data of more recent versions 7, 8 retrieved from the download center 12 is compiled data which is ready for use by the navigation device 1, without requiring this data to be combined at the navigation device with the base version 6 to generate a new version of the full digital map.

While a version of the digital map 7 which is more recent than the base version 6 and another version of the digital map 8 which is more recent than the version of the digital map 7 are illustrated as being stored in the database 3, data belonging to a previously downloaded version may be deleted when some blocks of an even newer release are downloaded. That is, in some implementations, the map data of the version 7 may be removed from the database 3 as soon as the first data of the version 8 is downloaded.

Figure 3:
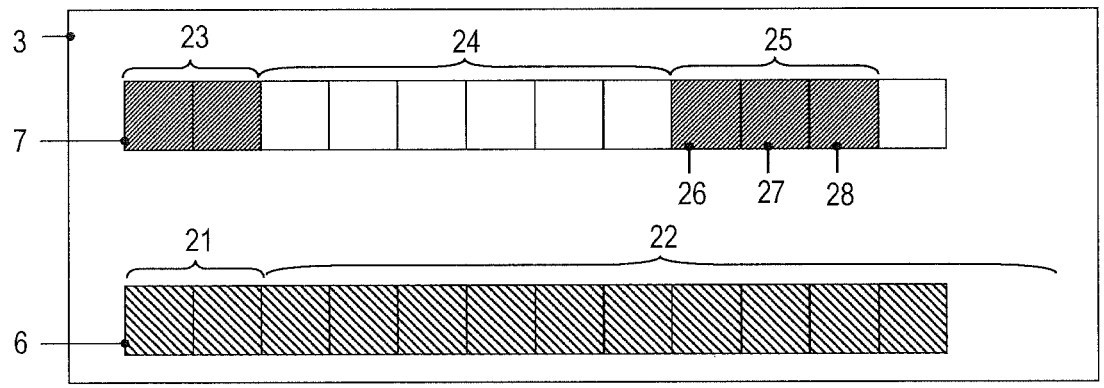
FIG. 3 is a schematic representation of a database of the navigation device.

FIG. 3 is a schematic representation of the database 3 of the navigation device after several data blocks of a version of the digital map have been downloaded and stored in addition to a base version 6.

The database 3 includes the base version 6 of the digital map. The base version includes data stored in a plurality of blocks of a file. Some of the blocks 21 may serve as a header which includes information on, for example, the base version 6. The header blocks 21 may include a version identifier for the base version 6. The version identifier may be a release data of the base version 6. A plurality of other blocks 22 may store information on at least one of routing, points of interest, possible destinations, or similar. Separate files may be provided for the different components of a digital map. For example, a separate file may be provided for destinations. Another separate file may be provided for points of interest. Another separate file may be provided for routing information, etc.

The database 3 includes the map data of another version of the digital map 7. For the other version of the digital map 7, at least some blocks are downloaded in operation of the navigation device. Some of the blocks 23 may serve as a header which includes information on, for example, the version of the digital map 7. The header blocks 23 may include a version identifier for the version of the digital map 7. The version identifier may be a release date of the version of the digital map 7. The database 3 includes several blocks 25 of the version of the digital map 7 which store, for example, routing information, points of interest, possible destinations, or similar.

Different storage blocks 26-28 which are downloaded to the navigation device 1 may correspond to certain geographical areas, but do not need to correspond to such certain geographical areas. For example, several storage blocks 26-28 may be required to store routing information for one tile of a tiling, which defines a square geographical area. There does, and generally will not, be a direct correspondence between a block of the base version 6 and a block of the more recent version of the digital map 7. That is, there does not need to be any block or combination of blocks in the base version 6 which defines the digital map for a geographical region which is identical to the geographical region covered by the block 26, or by the combination of the blocks 26-28 of the more recent version of the digital map 7.

While downloading data is implemented at the block-level, the header blocks 23 and the blocks 26-28 do not have to be downloaded separately. For example, a data packet may be formed at the data center. Several blocks, such as the header blocks 23 and/or the blocks 26-28 may be combined into the data packet. The data packet may be retrieved by the navigation device 1 from the download center 12.

In some implementations, the blocks 24 may be reserved for later downloading of blocks which are not yet required upon execution of the navigation task which triggered downloading of the blocks 26-28. When the first blocks of a new version of the digital map are downloaded, storage space may be reserved which would allow the complete version of the digital map to be stored locally in the database.

Figure 4:
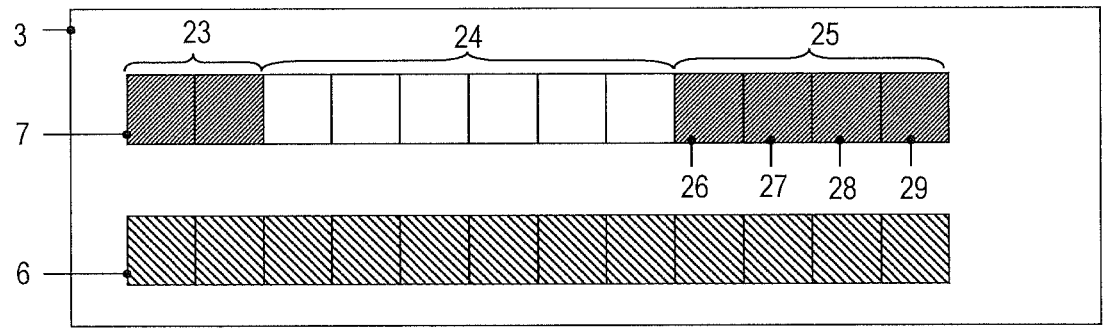
FIG. 4 is a schematic representation of the database of the navigation device after another storage block is downloaded for execution of a navigation task.

In other implementations, it is not required to reserve blocks, such as the blocks 24 indicated in FIG. 4. The map data of version of the digital map 7 which is downloaded and stored in the database defines a data set. When additional data is downloaded which corresponds to the same version of the digital map 7, as indicated by the release date or another suitable version identifier, this data may be added to the existing data set. An index file may be generated and may be updated when additional blocks of the version of the digital map 7 are retrieved, to facilitate retrieval of data. The index file may be organized in accordance with a distance metric. For example, the index file may be a B-tree or a B plus-tree.

FIG. 4 illustrates the database 3 when data from another storage block 29 is required for execution of another navigation task, while the version 7 of the digital map is still the newest version available.

In this case, upon execution of the navigation task, data of the storage block 29 is downloaded from the download center to the navigation device 1. The storage block 29 is added to the data set in which the version 7 is stored.

The downloading of blocks of newer versions of the map data is done in association with specific navigation tasks, such as entering destinations, route search, map display, requesting information on points of interest, requesting travel guide information, or similar. Correspondingly, the geographical area covered by the downloaded map data of versions which are newer than the base version may be smaller, and frequently much smaller, than the full geographically area covered by the base version.

Figure 5:
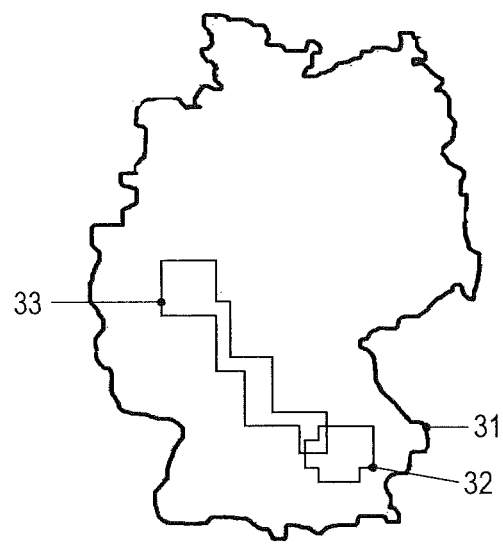
FIG. 5 illustrates geographical areas for which map data is available in the database.

FIG. 5 illustrates that the base version of a digital map may cover a geographical region 31, such as the area of a country. When the navigation device is used in a local region, for example when commuting to work, the downloaded map data of the newer version of the digital map may cover an area 32 which is sufficient to perform the respective navigation tasks, but which is much smaller in area than the full country 31. As long as the data downloaded for navigation tasks in the area 32 is sufficient to re-execute navigation tasks previously performed or to execute other navigation tasks which do not require information on areas located outside area 32, and as long as no even newer version of the map data becomes available, the data cached in the database of the navigation device may be continued to be used.

When another navigation task is performed, such as route search to a destination located outside the region 32 or map display for a location outside the region 32, and an even newer version of the digital map is available, the downloaded map data of the even newer version of the digital map may cover an area 33 which is sufficient to perform the respective navigation tasks, but which is much smaller in area than the full country 31. As long as the data downloaded for navigation tasks in the area 33 is sufficient to re-execute navigation tasks previously performed or to execute other navigation tasks which do not require information on areas located outside area 33, such as a route search in the reverse direction, the data cached in the database of the navigation device may be continued to be used.

Pre-fetching of data may be used when execution of the navigation task is started before the downloading of the required storage blocks has been completed. The available bandwidth for downloading storage blocks may be monitored. In areas in which data transmission rates between the download center and the navigation device are high, for example greater than a threshold, the navigation device may download a relatively large number of storage blocks relating to the remaining route from the present vehicle position to the destination. For example, assuming that there is LTE coverage in the area 32 in FIG. 5, but not outside the area 32, the navigation device may make download as much of the data relating to area 33 as possible while still being located in the area 32 where high bandwidth is available.

Pre-fetching may be performed over the wireless interface. Alternatively or additionally, data may be loaded from a storage medium which may be physically coupled to the navigation device and/or may be transmitted ova a short-range wireless communication channel. For example, if no online connection is available, a storage medium such as for example a flash memory, USB stick, CD or DVD may be used to selectively download blocks of a version of the digital map to the database for executing a navigation task. The data of the digital map which are downloaded to the navigation device may include a sub-set of storage blocks which is selected based on a location. The storage blocks of the digital map which are downloaded to the navigation device from a physical storage medium may be selected based on a current location of the navigation device and/or based on a desired location. The storage blocks of the digital map that are downloaded to the navigation device from a physical storage medium may be selected based on a navigation task which is to be performed.

Selectively downloading data of a recent map version from a physical storage medium may be performed at specific service locations, such as vendors or retailers for map updates. The specific service locations may include gas stations and/or garages. The specific service locations operate as service points where storage blocks of map data may be retrieved even if no high-bandwidth connection to a mobile communication network is available. At these specific service location, there may be available for downloading at least the sub-set of the plurality of storage blocks which corresponds to a neighborhood of the respective specific service location.

Figure 6:
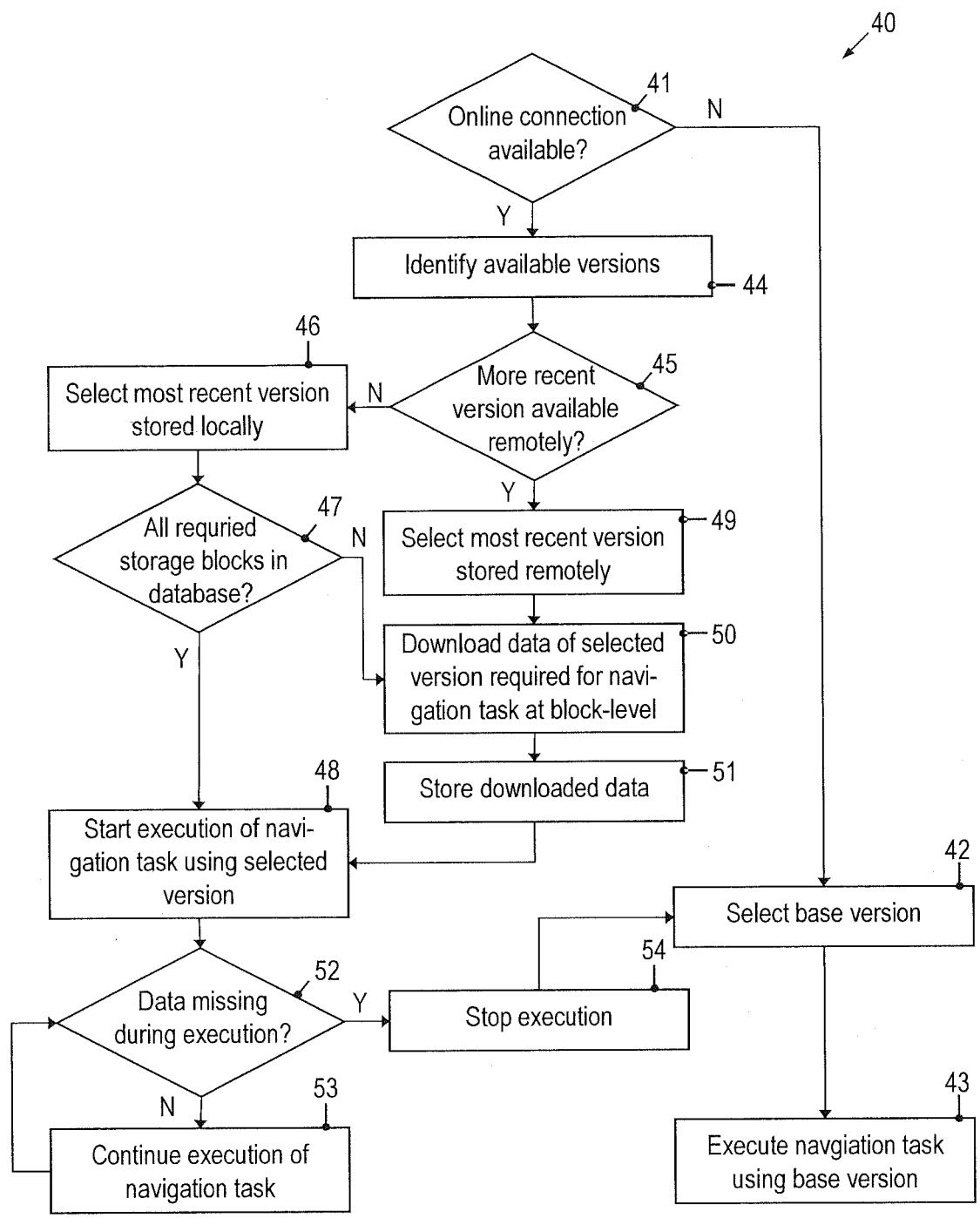
FIG. 6 is a flow chart illustration of a method of updating a navigation device database.

FIG. 6 is a flow chart of a method 40. The method 40 may be performed by the processing device 2 of the navigation device 1. The method 40 may be triggered upon execution of a navigation task. The navigation task may be initiated by a user action. The navigation task may also be initiated automatically using look-ahead logics. An automatic initiation of the method using look-ahead logics may be based on historical data collected for usage of a vehicle.

In the method, different versions of the digital map may be used depending on whether a wireless connection can be established for downloading data, and depending on which data has already been stored locally. Generally, the following scenarios may be distinguished:

(A) No online connection is available for downloading map data. In this case, the base version stored locally in the database of the navigation device will be used for execution of a navigation task.

(B) An online connection is available, and all data blocks of the most recent version of the digital map required for execution of the task are already stored locally. In this case, the navigation task is executed based on the latest version of the digital map cached locally in the database of the navigation device.

(C) An online connection is available, and all or some of the blocks of the most recent version of the digital map which are required for execution of the navigation task are not available locally in the database of the navigation device. In this case, the respective blocks are downloaded and stored in the database. The database of the navigation device serves as a cache for the downloaded data.

The method 40 of FIG. 6 will be explained separately for the three scenarios (A)-(C).

(A) No online connection is available.

At step 41, it is determined whether an online connection is available which meets pre-defined quality criteria for downloading the blocks required for execution of a navigation task in an acceptable time. When no online connection is available, the method proceeds to step 42.

At step 42, the base version of the digital map stored locally in the database is selected for execution of the navigation task. At step 43, the navigation task is executed using the base version of the digital map. For example, if the navigation task is a route search, the route search may be performed using the base version of the digital map stored locally in the navigation device.

(B) An online connection is available, and all data of the most recent version of the digital map which is required for execution of the navigation task is already stored locally.

At step 41, it is determined whether an online connection is available which meets pre-defined quality criteria for downloading the blocks required for execution of a navigation task in an acceptable time. When an online connection is available, the method proceeds to step 44.

At step 44, the available versions of the digital map are identified. Identifying available versions may include identifying versions of the digital map for which at least some blocks are stored locally in the database of the navigation device, and identifying versions of the digital map which are available remotely at a download center. Versions may be identified by a suitable version identifier, such as a release date.

At step 45, it is determined whether a more recent, i.e., newer, version than the most recent version cached locally is available remotely. When no newer version of the digital map is available at the download center, the method proceeds to step 46.

At step 46, the most recent version for which data are cached in the database of the navigation device is selected for execution of the navigation task.

At step 47, it is determined whether all storage blocks required for execution of the navigation task are already cached locally. While shown as a separate step in FIG. 6, the determining at step 47 may also be made implicitly using a map access layer which selectively either accesses data stored locally in the database or first downloads the data blocks from the download center.

If all blocks of the selected version required for execution of the navigation task are already cached in the database of the navigation device, the method proceeds to step 48.

At step 48, execution of the navigation task is started. The navigation task is executed based on the blocks of the selected version which have been previously downloaded to the navigation device and cached in the database. Execution of the navigation task may be independent of the base version stored in the database in this case.

During ongoing execution of the navigation task, monitoring steps may be performed and the base version may be invoked as a fall-back variant. For example, if the driver of the vehicle leaves a pre-determined route, the data required to perform the route search starting from the present position may no longer be available locally in the navigation device. Another scenario where the cached data may no longer be sufficient to execute a navigation task is when preferences are modified.

At step 52, it is determined whether data required for execution of the navigation task are missing in the locally cached data. If the required data are still available, the method proceeds to step 53. At step 53, execution of the navigation task is continued, still using the version of the digital map selected at step 46.

If it is determined that data required for execution of the navigation task are missing, the method proceeds to step 54. At step 54, the execution of the navigation task is stopped. The method proceeds to step 42. At step 42, the base version is selected as fall-back data. The method proceeds to step 43, where the navigation task is re-executed using the base version which is stored in the database.

(C) An online connection is available, and all or some of the blocks of the most recent version of the digital map which are required for execution of the navigation task are not available locally in the database of the navigation device.

(C-1) No block of the most recent version of the digital map has been previously downloaded.

At step 41, it is determined whether an online connection is available which meets pre-defined quality criteria for downloading the blocks required for execution of a navigation task in an acceptable time. When an online connection is available, the method proceeds to step 44.

At step 44, the available versions of the digital map are identified. Identifying available versions may include identifying versions of the digital map for which at least some blocks are stored locally in the database of the navigation device, and identifying versions of the digital map which are available remotely at a download center. Versions may be identified by a suitable version identifier, such as a release date.

At step 45, it is determined whether a more recent, i.e. newer, version than the most recent version cached locally is available remotely. When a newer version of the digital map is available at the download center, the method proceeds to step 49.

At step 49, the most recent version of the digital map which is available is selected. The most recent version in this case is a version which is stored remotely at a download center, and no blocks of this version have previously been cached in the database.

At step 50, data of the selected version is downloaded. Downloading is implemented at the block-level. I.e., storage blocks of the database file for the selected version which contain data required for execution of the specific navigation task are selectively downloaded. Plural storage blocks may be combined to a larger data packet for transmission.

At step 51, the downloaded data is stored in the database of the navigation device. The downloaded data may be re-used upon re-execution of the navigation task which has triggered the downloading, or upon execution of navigation task which can be performed based on the blocks retrieved from the download center.

The storing of downloaded data at step 51 may be performed such that the base version of the digital map stored in the database is not overwritten. The base version would thus remain available for execution of navigation tasks. Moreover, it is not required to combine the downloaded data with the base version of the digital map before the navigation task is executed, using the downloaded data stored at step 51.

The method then proceeds to step 48. Execution of the navigation task and possible use of the base version as fallback variant at steps 52-54 may be implemented as described above.

Execution of the navigation task may be started at step 48 while the downloading at step 50 is still in progress. For example, for many route search algorithms, such as Dijkstra or A* algorithms, an edge expansion is performed which starts in proximity to a current vehicle position and then expands towards the destination. This allows the route search to be started while the downloading of data is still ongoing.

(C-2) One or plural blocks of the most recent version of the digital map have been previously downloaded.

Steps 41 and 44 are performed as described above.

At step 45, it is determined that the newest version of the digital map which is available remotely from the navigation device is identical to a version for which one or some blocks have previously been stored in the database of the navigation device. The method proceeds to step 46, where the most recent version of the database stored locally is selected for execution of the navigation task.

At step 47, it is determined whether all storage blocks required for execution of the navigation task are already cached locally. While shown as a separate step in FIG. 6, the determining at step 47 may also be made implicitly using a map access layer which selectively either accesses data stored locally in the database or first downloads the data blocks from the download center.

If not all blocks of the selected version required for execution of the navigation task are already cached in the database of the navigation device, the method proceeds to step 50. The method then continues with downloading data of the remaining storage blocks which are required for execution of the navigation task, as described above.

In each one of the described devices and methods, the base version may be used in some instances even when an online connection is available to further reduce bandwidth requirements. For example, even if a more recent version of the map would be available for downloading from the download center, it may be decided that no storage block is downloaded. Such a decision may be made based on the size of the storage block(s). For high-volume storage block(s), the base version may be used instead of downloading the storage block(s) via the wireless interface. An example for such high-volume storage block(s) may be 3D data. The decision to use the base version even when an online connection is available may be made by comparing the size of the storage block to a threshold. The threshold may be selected based on the data transmission rates which are available for downloading. The threshold may be selected based on the availability of certain wireless networks, such as UMTS or LTE. For example, in areas having LTE coverage, the threshold may be set to a value which is greater than in other areas which do not have LTE coverage.

In each one of the devices and methods described, intelligent pre-fetching of data may be performed. Such techniques may be used in particular when execution of the navigation task is started before the downloading of all data has been completed. To this end, the available bandwidth may be monitored. In areas in which data transmission rates between the download center and the navigation device are high, the navigation device may download a relatively large number of storage blocks relating to the remaining route from the present vehicle position to the destination. For example, whenever the navigation device is located in an area where there is access to a LTE wireless network, the navigation device may download as many storage blocks as possible while still being located in the area having access to the LTE network. The downloaded storage blocks may be selected based on the present vehicle location and the remaining route to the destination. Thereby, problems associated with lower available bandwidth along certain portions of a route may be mitigated. For example, relevant data may be pre-fetched before the vehicle enters a tunnel or drives over a bridge.

Alternatively or additionally, data may be retrieved from a physical storage medium such as a flash memory, USB stick, DVD or CD, in areas in which data transmission rates between the download center and the navigation device are less than a threshold. In this case, vendors or other specific service locations may have available a physical storage medium which stores at least storage blocks for a neighborhood of the respective service location.

While certain decision steps are illustrated in the flow chart 40 of FIG. 6, not all of these decision steps must be implemented as separate decision steps. In some implementations, a map access module may be provided which is configured to automatically retrieve storage blocks of a selected version either from the local database or, via a wireless connection, from the download center. In this case, the decision block 47 is performed implicitly by the map access component.

The method may include additional steps. For example, if the most recent version of the digital map is available remotely from the navigation device and no blocks of this version have been downloaded to the navigation device, yet, cached data of older downloaded versions may be removed from the database before or after performing steps 50 and 51.

A signal flow which may be implemented at the navigation device and at the download center will be explained with reference to FIGS. 7 and 8. The modules and signal flows explained with reference to FIGS. 7 and 8 may be used to perform the method 40 of FIG. 6.

Figure 7:
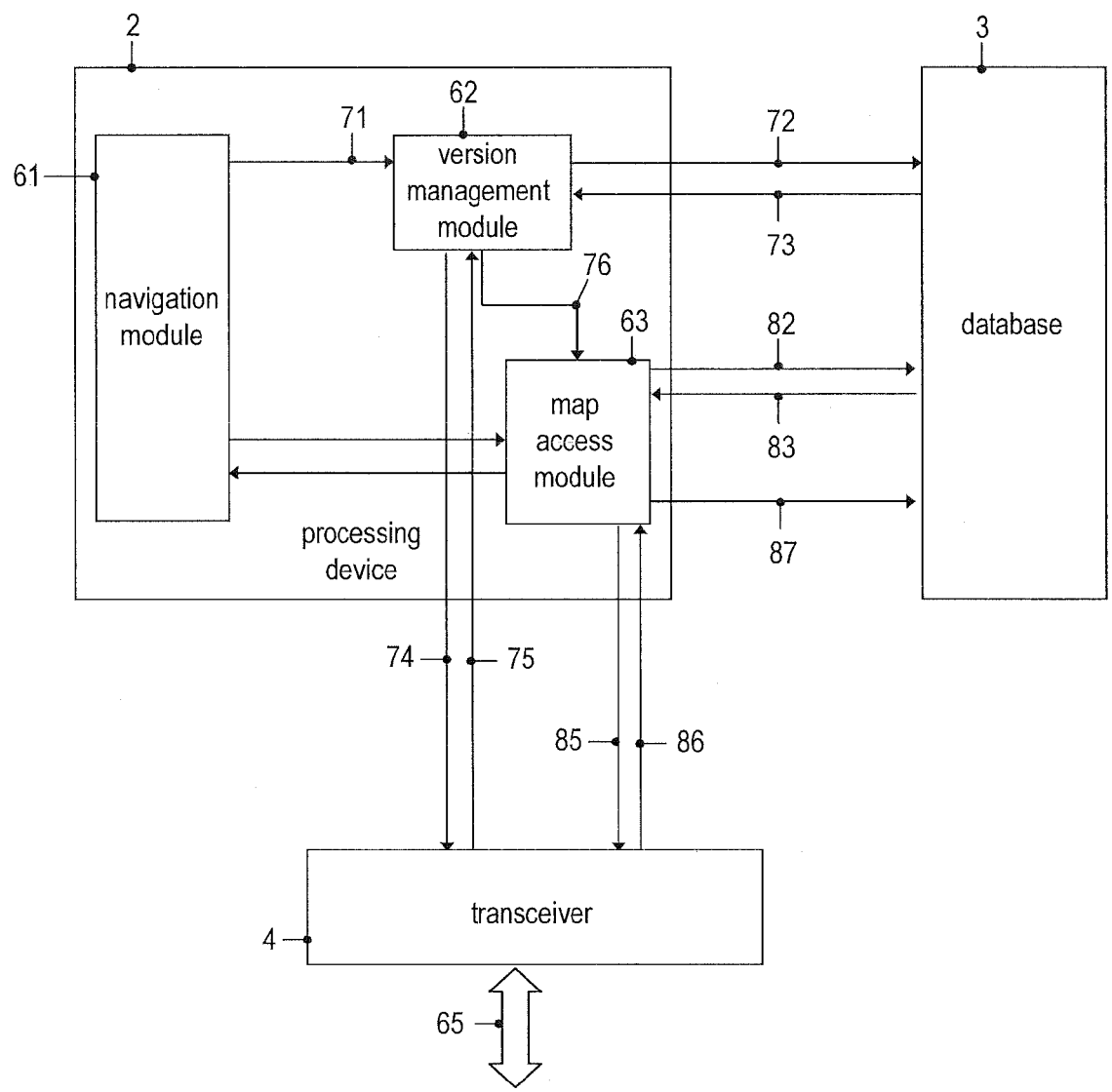
FIG. 7 is a schematic block diagram illustration of a navigation device illustrating a signal flow at the navigation device.

FIG. 7 is a schematic illustration of signal flows in the navigation device 1. The navigation device implementing signal flows as illustrated in FIG. 7 may be used in the system 11 of FIG. 1.

The processing device 2 of the navigation device 1 executes various program modules. The processing device 2 may execute a navigation module 61 that executes one or several navigation tasks. The processing device 2 may execute a version management module 62 configured to provide information on available versions of a digital map. The processing device 2 may execute a map access module 63 configured to selectively retrieve data directly from the local database 3 or to download data blocks of a version of a digital map from a download center.

During operation, the navigation module 61 may issue a version query 71 to the version management module 62. The version management module 62 may retrieve information on versions of a digital map which are available locally in the database or remotely from the navigation device. The version management module 62 issues a local version query 72 to the database 3. A local version response 73 indicates version identifiers for all versions of the digital map for which at least some data blocks are stored in the database 3, or for the latest version available locally. Versions which are available locally always include the base version. When data of a newer version has previously been downloaded and stored in the database 3, the local version response 73 includes a version identifier of this version.

The version management module 62 further issues a remote version query 74. The remote version query 74 is transmitted by the transceiver 4. The remote version query 74 is transmitted over an air interface 65. In response to the remote version query 74, a remote version response 75 is received. If no connection can be established with a download center via the network 19, the remote version response 75 may indicate a connection fail. In this case, no remote versions are available for downloading. Otherwise, the remote version response 75 received from the download center may indicate the versions of the digital map which are available remotely from the navigation device, or the most recent version available for downloading at the download center. The download center may indicate only those versions of the digital map in the remote version response 75 which have been published, i.e., which have been made available for downloading.

Rather than indicating all versions in the local version response 73 and the remote version response 75, it may also be sufficient to only include a version identifier for the most recent version of the digital map available locally or remotely.

The version management module 62 processes the local version response 73 and the remote version response 75. The version management module 62 may select the newest one of the versions available locally or, if an online connection has been established, remotely. The selected version may be indicated in a version response 76. The version response 76 may be provided to the map access module 63 for subsequent use in retrieving data. In other implementations, the version response 76 indicative of the selected version may also be provided to the navigation module 61.

When the navigation module 61 requires map data for execution of a navigation task, it issues a map data request 81 to the map access module 63. The map access module 63 retrieves the requested map data from the version of the digital map indicated by the version response 76. If the version response 76 is returned to the navigation module 61, the selected version of the map may be indicated in the map data request 81.

The map access module 63 is configured such that it retrieves the requested map data from the local database 3 if the data is stored therein. Otherwise, the map access module 63 automatically initiates a procedure in which the required blocks of the selected version of the digital map are downloaded via the air interface 65 and are stored in the database 3. The database 3 serves as cache for the downloaded data.

In response to receiving the map data request 81, the map access module accesses the database with a map data query 82 indicating the requested map data. For example, an index structure of the database 3 may be accessed to determine a storage location of the requested map data. If the map data of the selected version is stored locally in the database 3, a map data response 83 includes the requested map data. The map access module 63 provides the map data 84 to the navigation module 61. The navigation module 61 uses the map data 84 to execute the navigation task.

If the requested map data of the selected version is not yet stored locally in the database 3, the map data response 83 indicates that the requested data is not available locally. For example, if an index file is used to retrieve data from the database, it may be possible to determine based on the index file that the requested map data is not yet stored locally in the database 3. In this case, the map access module 63 generates a download request 85. The download request 85 indicates the data requested by the navigation module 61. The download request 85 is transmitted, using the transceiver 4, via the air interface 65.

In response to transmitting the download request 85, the navigation device receives one or plural data blocks 86 of the selected version via the air interface 65. The data 86 received by the transceiver 4 are processed by the map access module 63. The map access module 63 issues a store map data command 87 to the database 3, to store the received blocks 86. The requested data may be provided to the navigation module 61 as map data 84.

In a failure case in which requested map data are not stored locally in the database 3 and in which no response including the required data blocks is received from the download center, the map data signal 84 may indicate a fail case. The base version of the digital map may then be selected as fallback variant.

Figure 8:
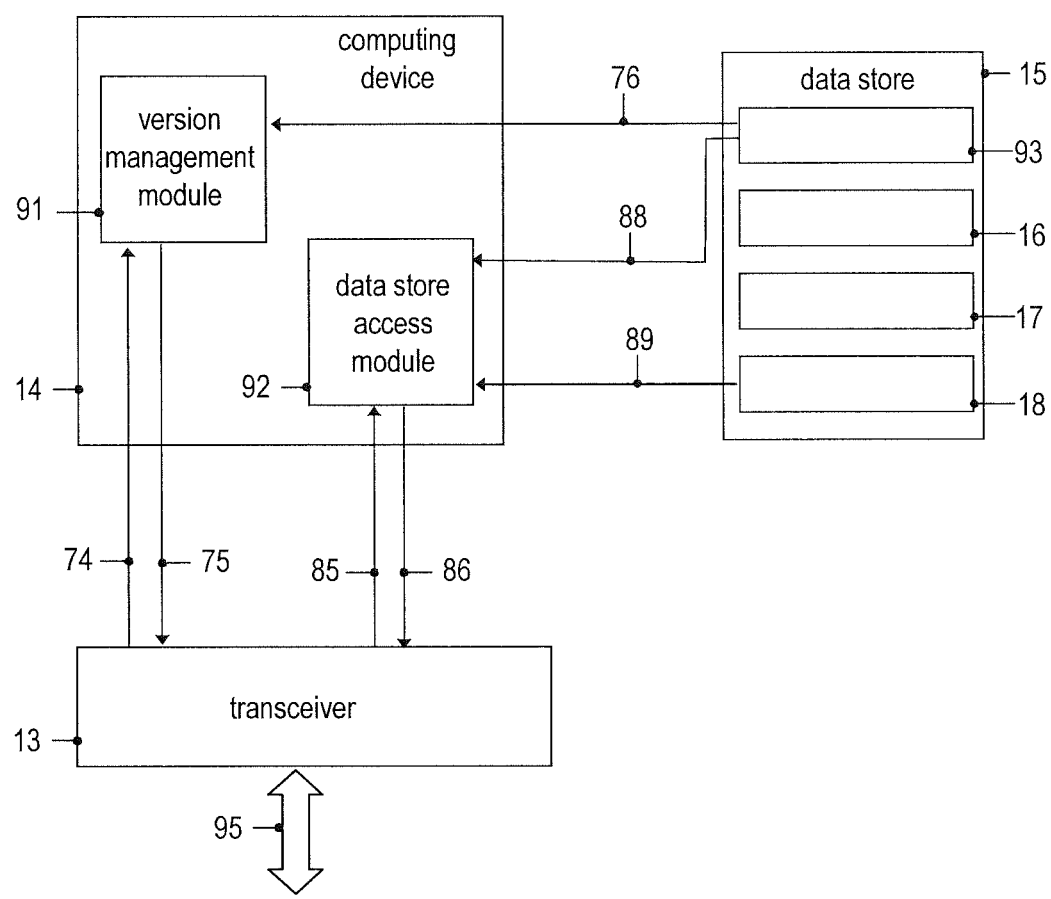
FIG. 8 is a schematic block diagram illustration of a download center illustrating a signal flow at the download center.

FIG. 8 is a schematic illustration of signal flows at the download center. The download center implementing signal flows as illustrated in FIG. 8 may be used in the system 11 of FIG. 1. The download center includes a computing device 14 and a data store 15. The computing device 14 is coupled to a transceiver 13 to communicate with a wireless network over an interface 95. The transceiver 13 does, by itself, not need to be a wireless transceiver. The download center 13 may be interfaced with a core network of the mobile communication network 19.

The computing device 14 of the download center executes various program modules. The computing device 14 may execute a version management module 91 configured to provide information on available versions of a digital map. The computing device 14 may execute a data store access module 92 configured to selectively retrieve data from the data store 15.

When the remote version request 74 issued by the navigation device is received at the transceiver 13, the version management module 91 retrieves information 76 on versions of the digital map stored in the data store 15, which are available for being downloaded by a navigation device. The various versions 16-18 which are available for being downloaded are compiled digital maps which do not need to be combined with the base version of the digital map stored at the navigation device in order to be used for navigation tasks in the navigation device. Based on the information 76 on versions stored at the data store 15, the version management module 91 generates the remote version response 75. The remote version response 75 is output to a wireless communication network via the transceiver 13. The remote version response 75 may include information on all versions stored available for being downloaded from the data store 15. The remote version response 75 may for example include a version identifier, such as a release date, for each version available at the data store 15 for being downloaded. In another implementation the remote version response 75 may include information on the most recent, i.e. newest, version of the digital map available for being downloaded.

When the download request 85 issued by the navigation device is received at the transceiver 13, the data store access module 92 transmits a sub-set of storage blocks of one of the database files 16-18. The download request 85 may be indicative of a selected version. If no version identifier is provided in the download request 85, the most recent version may automatically be selected by the data store access module 92. The data store access module 92 may access an index file 93 or other index structure to identify the storage blocks of the respective data file 17-18 which are to be transmitted. The data store access module 92 transmits one or plural data blocks 86 of the selected version. The data store access module 92 may combine the blocks into a data package for transmission.

Additional or alternative message flow may be implemented. For example, if a decision on whether a storage block is to be downloaded is further made depending on the size of the storage block, the navigation device may transmit a message to request information on the size of a storage block which may be downloaded for the specific navigation task. The navigation device may receive a response indicating the storage block size. The transmitted storage block size may be used by the version management module 62 and/or by the map access module 63 to decide whether the storage block is to be downloaded or whether the base version is to be used. The version management module 62 and/or the map access module 63 may perform a threshold comparison. The version management module 62 and/or the map access module 63 may set the threshold based on transmission rates available for downloading the storage block(s).

The base version and the data blocks of the downloaded version of the digital map may be stored in the database 3 of the navigation device using any one of a variety of formats. In some implementations, relational databases may be used. There may be a separate table for each different version stored in the database 3. The table may respectively include a version identifier.

Figure 9:
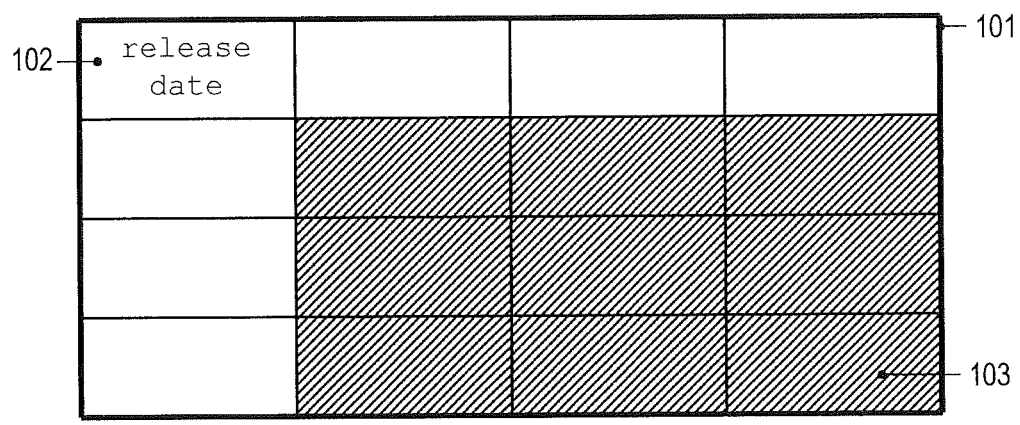
FIG. 9 is a diagram illustrating a database of a navigation device.

FIG. 9 schematically illustrates a relational database 101 storing a version of the map data. The relational database 101 includes a version identifier 102. The version identifier 102 may be a release date. The relational database 101 may include the map data of the base version or the downloaded data 103.

In other implementations, one relational database may be set up to store data from different versions of the digital map.

Figure 10:
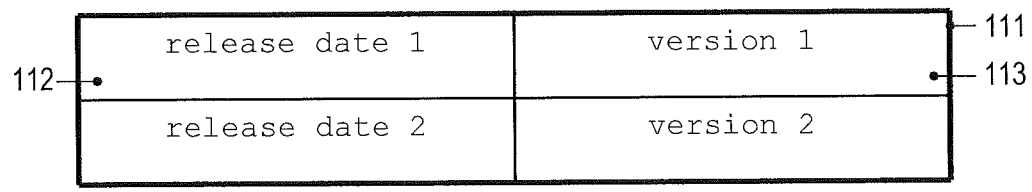
FIG. 10 is a diagram illustrating another database of a navigation device.

FIG. 10 schematically illustrates a relational database 111 storing map data from different versions, such as a base version and data of a newer version of the digital map downloaded to the navigation device. The relational database 111 respectively includes a version identifier 112, such as a release date, and data 113 or a pointer to the data of the respective version of the map data.

While devices and methods according to embodiments have been described in detail, modifications may be implemented in other embodiments. For example, the downloading of map data at the block-level may be triggered by a wide variety of navigation tasks, including route search, route guidance, requesting information on a point of interest, map display including requesting 2D or 3D map data for displaying, requesting travel guide information, advanced driver assistance functions, or similar.

For further illustration, while embodiments have been described in which data of more than two different versions may be present in the database of the navigation device, the portion of the database which is used as a cache for storing downloaded data may be cleared when a newer version than the previously downloaded version becomes available.

For further illustration, in the embodiments described with reference to the drawings, look-ahead logics may be used to anticipate which navigation task a user is likely to activate. The downloading of data blocks of a newer version of the digital map may thus be initiated before a user actually starts specific navigation tasks.

For further illustration, a version of a digital map may include a plurality of different components. For example, there may be components naming, for points of interests, for phonemes, for routing, for basic map display, for advanced map display, for guidance bitmaps, for advanced driver assist system (ADAS) functions, for travel guide functions, or for metadata. While these components may be combined in a database file in some implementations, in other implementations the components may also be provided as separate data sets. In this case, the procedures described herein may be used for each one of the different components.

Embodiments of the invention may be used for maintaining database of vehicle navigation devices.

Although the present invention has been illustrated and described with respect to several preferred embodiments thereof, various changes, omissions and additions to the form and detail thereof, may be made therein, without departing from the spirit and scope of the invention.

What is claimed is:

1. A method of updating a database of a navigation device, the database storing at least a base version of a digital map for a geographical area, the method comprising:
    identifying versions of the map for the geographical area which are available locally in the database or remotely from the navigation device;
    executing a navigation task, including
    selecting, based on the identified versions, a version of the digital map for execution of the navigation task, the selected version including data stored in a plurality of storage blocks, wherein data from a sub-set of said plurality of storage blocks is required to execute the navigation task;
    selectively downloading over a wireless interface, depending on whether all storage blocks of the sub-set are already stored locally in the database, data stored in storage blocks of the sub-set which are not yet stored locally in the database, and storing the downloaded data in the database without modifying the base version of the digital map; and
    using the data of the sub-set to execute the navigation task.

2. The method of claim 1,
    wherein the data of the sub-set stored in the database is re-used when the navigation task is re-executed or when another navigation task which requires data from the sub-set is executed, until a more recent version of the digital map is identified in the identifying step.

3. The method of claim 1,
    wherein, after the downloading and storing steps, the database includes a plurality of different versions of the digital map for a portion of the geographical area.

4. The method of claim 3,
    wherein, when another navigation task is executed, respectively one of the plurality different versions is selected for execution of the other navigation task.

5. The method of claim 1,
    wherein the database includes a version identifier for each of the plurality of versions of the digital map which is available locally in the database.

6. The method of claim 5,
    wherein the selectively downloading includes storing a version identifier for the selected version in the database if no storage block of the selected version is stored in the database prior to performing the downloading step.

7. The method of claim 5,
    wherein the base version of the digital map is selected to execute the navigation task if a version identifier for the base version indicates that the base version is as recent as or more recent than all versions of the digital map which are available remotely from the navigation device.

8. The method of claim 5,
    wherein the database is a relational database which includes the version identifiers as attributes.

9. The method of claim 5,
    wherein the database includes an index structure, and wherein the selectively downloading includes updating the index structure based on a version identifier for the selected version.

10. The method of claim 5,
wherein the database includes, for each version of the digital map which is available locally in the database, respectively a data set, and
wherein the storing includes determining, based on a comparison of a version identifier for the selected version and the version identifiers for versions which are available locally in the database, whether a new data set is to be generated for storing the downloaded data.

11. The method of claim 10,
wherein the downloaded data is added to a data set having a version identifier identical to the version identifier for the selected version if such a data set is already stored in the database prior to performing the downloading step.

12. The method of claim 1, comprising:
verifying whether a data transfer via the wireless interface meets a pre-defined criterion,
wherein the base version is selected for execution of the navigation task if the data transfer fails to meet the pre-defined criterion.

13. The method of claim 1,
wherein execution of the navigation task is started before the downloading is completed.

14. The method of claim 13, further comprising:
monitoring, during execution of the navigation task, whether a data transfer via the wireless interface meets at least one pre-defined criterion,
wherein the selectively downloading includes pre-fetching storage blocks based on whether the data transfer via the wireless interface meets the at least one pre-defined criterion.

15. A navigation device, comprising:
a database storing at least a base version of a digital map for a geographical area;
a processing device coupled to the database and configured to identify versions of the digital map for the geographical area which are available locally in the database or remotely from the navigation device, and to execute a navigation task, wherein the processing device is configured to
select, based on the identified versions, a version of the digital map for execution of the navigation task, the selected version including data stored in a plurality of storage blocks, wherein data from a sub-set of the plurality of storage blocks is required to execute the navigation task;
selectively download, based on whether all storage blocks of the sub-set are stored locally in the database, data stored in storage blocks of the sub-set which are not yet stored locally in the database, and store the downloaded data in the database without modifying the base version of the digital map; and
use the data of the sub-set to execute the navigation task, where the base version of the digital map remains accessible in unmodified form for use by the processing device of the navigation device.

16. The navigation device of claim 15, further comprising:
a transceiver coupled to the processing device;
the processing device being configured to wirelessly communicate, using the transceiver, with a download center in which updated versions of the digital map are provided for downloading.

\* \* \* \* \*